May 1, 1923.
A. KIMBLE
POWER TRANSMISSION APPARATUS
Filed Sept. 16, 1921
1,453,466
2 Sheets-Sheet 1
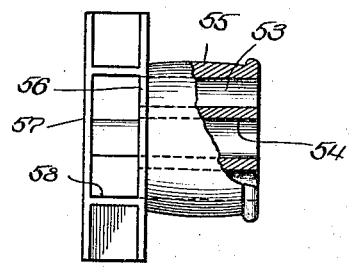
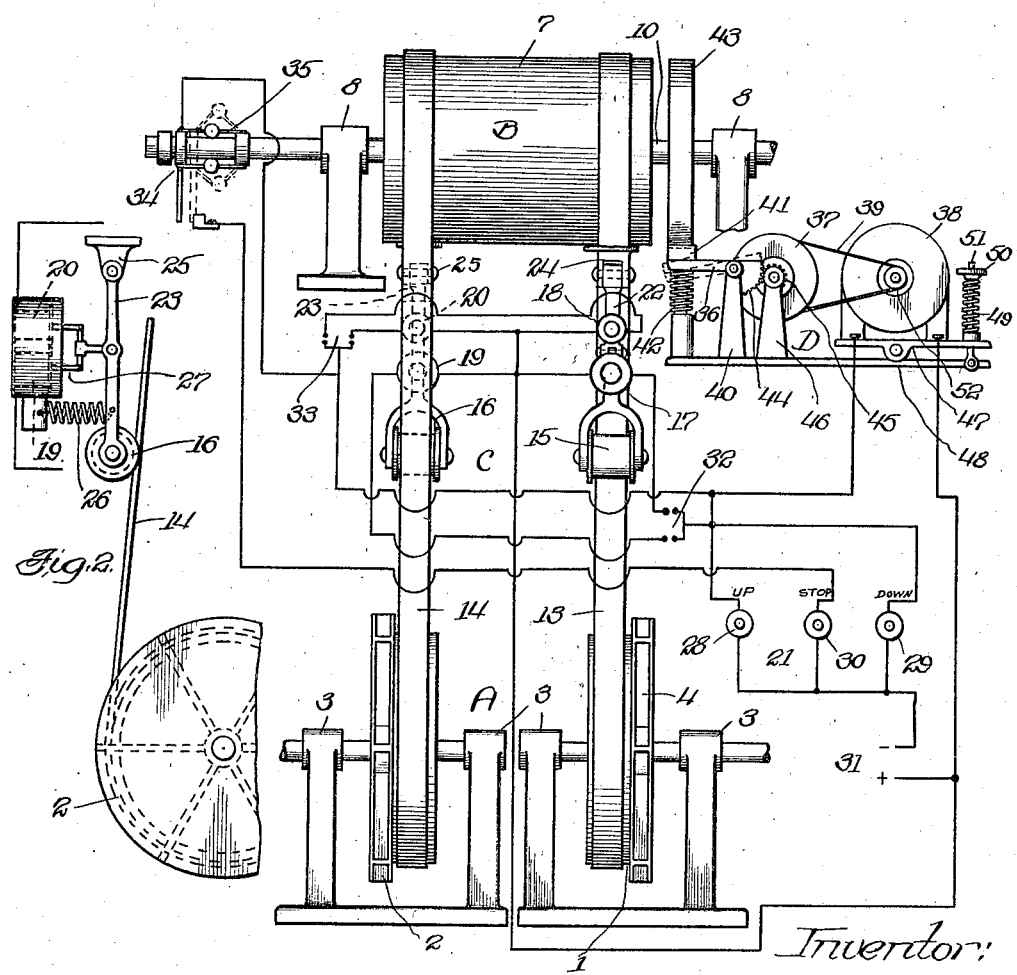
Inventor:
Austin Kimble.

May 1, 1923.

A. KIMBLE 1,453,466

POWER TRANSMISSION APPARATUS

Filed Sept. 16, 1921  2 Sheets-Sheet 2

3-PHASE

Witness
W. K. Olson

Inventor:
Austin Kimble.
By Rummler & Rummler Attys.

Patented May 1, 1923.

1,453,466

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

POWER-TRANSMISSION APPARATUS.

Application filed September 16, 1921. Serial No. 501,129.

*To all whom it may concern:*

Be it known that I, AUSTIN KIMBLE, a citizen of the United States of America, and a resident of Wausau, county of Marathon, and State of Wisconsin, have invented certain new and useful Improvements in Power-Transmission Apparatus, of which the following is a specification.

The main objects of this invention are to provide an improved form of power transmission apparatus adapted for ready application of mechanical power intermittently and in opposite directions to a rotary drive mechanism, and especially to mechanism adapted for propelling conveyances or vehicles which are frequently started, stopped and reversed, as for instance elevators; to provide an improved power transmission apparatus wherein the power-producing mechanism is operated continuously and is connected to the driving mechanism for the conveyance by improved means normally inoperative for transmitting power; to provide improved mechanism for causing said power-transmitting means to become operative so as to transmit power; to provide said mechanism with improved means for varying the amount of power to be transmitted by said power-transmitting means; to provide improved brake mechanism for checking the operation of and holding stationary the driving mechanism; to provide an improved construction and arrangement of electrical means for controlling the action of said last named means and said brake mechanism; to provide improved transmission apparatus of this kind which is particularly adapted for use with alternating current motors as the source of power; and to provide an improved power transmission apparatus of this kind which is especially adapted for electric elevator operation.

An illustrative embodiment of this invention is shown in the accompanying drawings, in which:

Figure 1 diagrammatically indicates the arrangement of a power-transmission apparatus constructed in accordance with this invention without regard to the particular kind of power employed.

Fig. 2 is a detail view illustrating the arrangement of one of the solenoids and idlers which control the tension of the belts.

Figure 4:
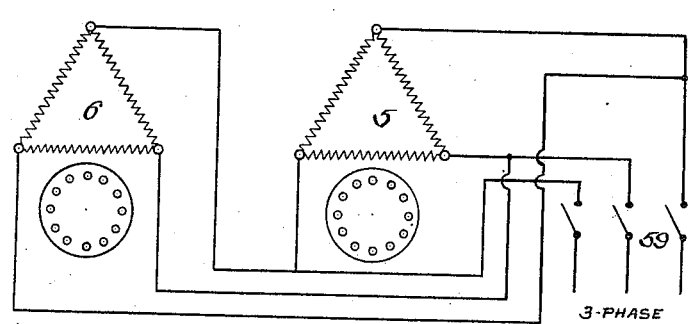

Fig. 4 diagrammatically illustrates the arrangement of circuits connecting the alternating current motors with a source of electricity.

Fig. 5 is an enlarged side elevation partly sectional, of one form of pulley constructed to dissipate heat caused by a slipping belt, such a pulley being essential to the practical use of an apparatus of this kind.

A power transmission apparatus constructed in accordance with this invention involves the use of power-producing members connected with a suitable source of power whereby said members are continuously rotatable in opposite directions and connected with a driving member by means normally inactive to transmit power but coacting with mechanism adapted to be manually controlled so that said driving member can be driven in one direction or the other, said mechanism and the control therefor being so arranged that one or the other of the power-transmitting means may be used to provide a force positively counteracting the momentum of the driving member when the positive driving action of the opposite power-transmitting means has been discontinued. Included in the apparatus is means adapted to automatically discontinue the counteracting action of the power-transmitting means when the driving member approaches a position of rest and also cause suitable brake mechanism to be automatically applied to hold the driving member in its stationary position. A power-transmission apparatus of this kind is particularly suitable for use with alternating current motors especially in connection with elevators. However, there are other kinds of conveyances or vehicles which this apparatus may be used to propel and the source of power does not necessarily have to be electrical.

In the specific embodiment herein illustrated, the apparatus comprises a power-producing element A with which the conveyance or vehicle-driving member B is adapted to be operatively connected by electrically controlled power-transmitting means C, said driving member B being normally held in its stationary position by brake mechanism D.

Figure 3:
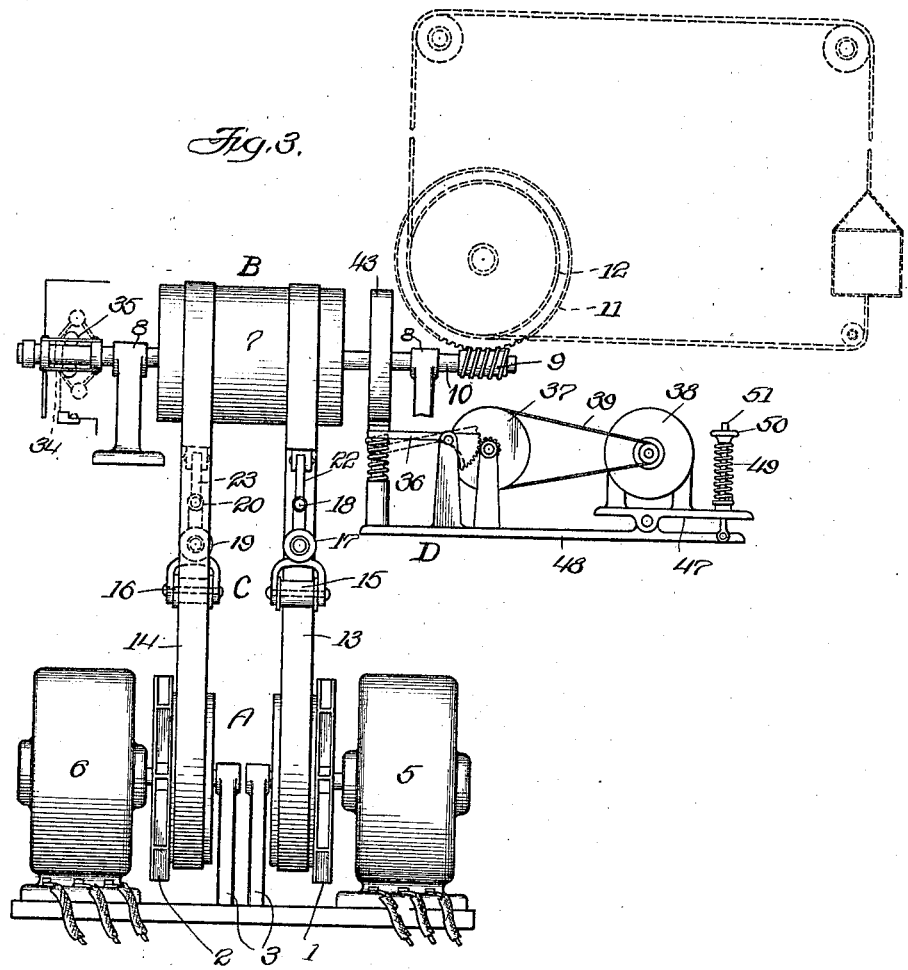
Fig. 3 is a view similar to Figure 1 reduced in its proportions and illustrating the use of a power transmission apparatus of this kind arranged to be driven by alternating current motors and connected for use in operating an elevator.

The power-producing element A as herein shown comprises a pair of members 1 and 2 preferably in the form of pulleys rotatably mounted in suitable bearings 3 and connected to a source of power in such a way that the members 1 and 2 may be continuously rotated in opposite directions. No particular source of power for rotating members 1 and 2 is essential to the successful use of this invention, but the apparatus is particularly adapted for use with electric motors preferably of the alternating-current type, in which case, suitable motors 5 and 6 would be connected to rotate the members or pulleys 1 and 2 somewhat as indicated in Fig. 3.

The conveyance or vehicle-driving member B is preferably in the form of a drum or wide pulley 7 journaled in bearings 8 and provided with suitable means connecting it with the conveyance or vehicle to be driven. Inasmuch as this apparatus is especially suitable for use with elevator mechanism, Figure 3 shows, in an abbreviated way, elevator mechanism in dotted outline connected with driving member 7. For that purpose a worm 9 is shown mounted on the end of the shaft 10, which carries the driving member 7, and meshing with a suitable gear 11 connected to the usual cable drum 12.

The power-transmitting means C comprises friction members in the form of belts 13 and 14 and tension regulating idlers 15 and 16 the shifting of which is effected by solenoids 17—18 and 19—20 respectively under the control of electrical switch mechanism 21. The arrangement of these parts is such that either of the belts may be tensioned one at a time either for causing the rotation of the drum or pulley 7 for the purpose of propelling the conveyance or vehicle, or for providing a temporary counteracting force to the momentum of the drum or pulley, immediately its driving connection with one of the power-producing pulleys is discontinued, so as to quickly and steadily bring the conveyance or vehicle to a stop.

The friction members or belts 13 and 14 extend around the pulleys 1 and 2 and the driving member 7 and are sufficiently loose so that normally no power is transmitted to the driving member 7 from the continuously rotating pulleys 1 and 2. Upon the shifting of one or the other of idlers 15 or 16, the corresponding belt will become tightened and will connect the driving member 7 in operative relation with the corresponding pulley 1 or 2.

The idlers 15 and 16 are journaled on arms 22 and 23 respectively, pivotally supported at their ends on brackets 24 and 25 and normally urged into retracted positions by springs 26 (see Figure 2). The arms 22 and 23 are connected to the respective solenoids 17—18 and 19—20 by suitable linkage 27 (see Figure 2) so that either solenoid, when energized, may urge the respective arm to shift the idler carried thereby against the corresponding belt.

The solenoids 17 and 19 are differently constructed from the solenoids 18 and 20 so that the former, when energized, exert a greater pressure of the idlers 15 and 16 against the belts 13 and 14 than do the solenoids 18 and 20. Such an arrangement is provided so that a greater tension on the belts 13 and 14 may be obtained when they are used to transmit power for driving the driving member 7 than when used to provide a force counteracting the momentum of the driving member 7.

The switch mechanism 21 which controls the energization of the solenoids 17—18 and 19—20 and the circuits for connecting these solenoids with a source of electricity are diagrammatically illustrated in the simplest way, it being understood that the wiring would depend upon the exact character of the switch and the character of some of well-known electrical devices which might be used for accomplishing certain purposes in connection with the proper functioning of the electrically-controlled devices. For the purpose of illustration, there is a switch 28 for controlling the power-transmission means to actuate the driving member 7 to move the conveyance or vehicle in one direction, a switch 29 for controlling the power-transmitting means to cause the conveyance or vehicle to be moved down in the opposite direction and a switch 30 for releasing the power-transmitting means to bring the conveyance or vehicle to a stop. These switches 28, 29 and 30 would necessarily have to be so constructed and interconnected mechanically or electrically that upon actuating the "stop" switch 30 after either the "up" switch or "down" switch had been shifted it would be reshifted to open the circuit which had been previously closed by the shifting of such switch.

The illustrative arrangement of circuits (Fig. 1) shows that the "up" switch 28 connects a source of electricity 31 with the solenoid 17 and the brake mechanism D (the latter to be more fully hereinafter explained), that the "down" switch 29 connects the source of electricity 31 with the solenoid 19 and said brake mechanism, and that the "stop" switch 30 connects the source of electricity 31 with one or the other of the solenoids 18 and 20. At certain points in the electrical circuits, as for example, at 32 and 33, suitable electrically controlled or mechanically operated devices will be used for the purpose of controlling the flow of electricity to one or the other of the solenoids of each pair. These devices are to be arranged so that they work in conjunction with the switches 28, 29 and 30. The device 32 is to operate so that upon shifting of the "up" switch 28 the circuit will be closed to the solenoid 17, and upon the shifting of the "down" switch 29 the circuit will be closed to the solenoid 19. Likewise the device 33 is to operate so that upon shifting the "stop" switch 30 after having shifted the "up" switch 28 the circuit will be closed to the solenoid 20, and upon shifting the "stop" switch 30 after having shifted the "down" switch 29 the circuit will be closed to the solenoid 18.

In order to sustain the circuits to the solenoids 18 and 20 and the brake mechanism D, after the reshifting of the switches 28 or 29 to open their respective circuits as affected by shifting of the "stop" switch 30, a switch 34 is connected in auxiliary circuits leading to said solenoids and brake mechanism D, which switch is controlled by a centrifugal governor 35 mounted on the shaft 10 of the drum or pulley 7. The switch 34 and governor 35, which are diagrammatically shown in the drawings, coact to close these particular circuits to the solenoids 18 and 20 and the brake mechanism D as soon as the drum or pulley 7 begins to rotate and retain such circuits closed until the drum or pulley 7 has come almost to a stop.

The brake mechanism D, as herein shown, corresponds with the construction shown in Patent No. 1,433,553, granted October 31, 1922, and comprises a brake member 36 connected to a rotatable or driven member 37 which is connected to the motor 38 by belt 39.

The brake member 36 is in the form of an arm pivotally mounted upon a bracket 40 and has its outer end provided with a shoe 41 which is normally urged by a spring 42 to bear against a part 43 secured to rotate with the shaft 10. The inner end of the arm has a gear segment 44 formed thereon which meshes with a gear or pinion 45 connected to rotate with the driven member or pulley 37 which is connected to a suitable shaft journaled in brackets 46.

The motor 38 is arranged upon a support 47 pivotally mounted upon a base 48 which also supports the brackets 40 and 46. Through the action of a spring 49 bearing between the support 47 and an adjustable nut 50 on a rod 51, a uniform tension is produced on the belt 49 so that during the operation of the motor 38 a constant torque is delivered to the driven member 37 with the result that upon starting the motor 38 the arm 36 is shifted to retract the shoe 41 and is held in its shifted position so long as the motor continues to operate, the pulley 52 on the motor 38 simply slipping relative to the belt 39.

The relative slipping of the belts 13 and 14 caused by the continuous rotation of the respective pulleys 1 and 2 heats the belts and pulleys and unless the heat is dissipated the belts would naturally become so seriously injured as to impair their usefulness. Accordingly it is essential to the practical operation of an apparatus of this kind to make use of some sort of pulley which can be cooled. One form of pulley particularly suited for this purpose is a ventilated pulley such as shown in U. S. Patent No. 1,372,700, granted February 23, 1921. This form of pulley is more clearly illustrated in Figure 5, the same having an axially disposed annular passage 53 between the hub 54 and the rim 55 communicating at its inner end with the radially disposed annular passage formed between the flanges 56 and 57. Vanes 58 are arranged between the flanges 56 and 57 so as to form a fan which, when the pulley is rotating, draws air in through the passage 53 and discharges it centrifugally outward from between the flanges 56 and 57.

For the same reasons just explained, pulley 52 would likewise be a ventilated type of pulley.

Where this power transmission apparatus is used in connection with electric motors such as illustrated in Figure 3, the motors are preferably of the three-phase squirrel cage type which are arranged to be connected with a source of electricity through the medium of a switch 59 as indicated in Figure 4, suitable voltage release switches and magnetic switch apparatus for the switch 59 being arranged in conjunction therewith. The switch 59 can be located either near the motors 5 and 6 or it can be located where the operator of the conveyance (such as the elevator car) could manipulate the same.

The operation of the device herein shown and described is substantially as follows:

The pulleys or member 1 and 2 being connected with a suitable source of power continue in rotation so long as the conveyance or vehicle, with which drum or pulley 7 is connected, is likely to be operated. With the switches 28, 29 and 30 open, the idlers 15 and 16 are retracted and no power is transmitted by the belts 13 and 14. Assuming that the apparatus is arranged to drive an elevator, when the operator desires to go up, he shifts the "up" switch 28 whereupon the circuit is closed to the magnet 17 and to the motor 38. The closing of the circuit to the motor 38 causes it, through the medium of the belt 39, to partially rotate the driven member 37 so as to retract and hold retracted the brake arm 36. The closing of the circuit to the magnet 17 causes it to become energized and shift the idler 15 to tension the belt 13 so as to cause the drum or pulley 7 to be rotated and through the worm 9, and gear 11 rotate the cable drum 12 to move the elevator car up.

When the operator desires to bring the car to a stop, the "stop" switch 30 is shifted. Through a suitable mechanical or electrical connection (not shown) with the "up" switch 28, the latter is reshifted to its normal position to open the circuit to the solenoid 17, whereupon the spring 26 retracts the idler 15 so that the belt 13 discontinues to transmit power to the drum or pulley 7. The shifting of the "stop" switch 30 also completes the circuit to the solenoid 20 through the governor-controlled switch 34 which was closed as soon as the drum or pulley 1 was rotated and which completed an auxiliary circuit to the motor 38 and prevented the motor from being shut off when the reshifting of the switch 28 opened the circuit that it had previously closed. Closing the circuit to the solenoid 20 causes the idler 16 to be shifted to tension the belt 14 so that it is moved by the pulley 2 in a direction opposite that in which the drum or pulley 7 has been rotated by the belt 13 and sets up a force counteracting the momentum of the drum or pulley. This force acts as a brake on said drum or pulley and quickly and steadily brings the drum or pulley 7 to a position of rest.

Just as the drum of pulley 7 is about to come to rest the governor 35 retracts the switch 34 which opens the circuits to the solenoid 20 and the motor 38 whereupon the idler 16 is retracted by the spring 26 and the brake arm 36 is shifted by the spring 42 to bring the shoe 41 into contact with the part 43 and completely stop the rotation of the drum or pulley 7 and hold it in its stationary position.

When the operator desires to have the elevator car move down, he presses the "down" switch 29 whereupon the circuit to the solenoid 19 and the motor 38 is closed causing a retraction of the brake arm 36 and a rotation of the drum 7 in like manner as was explained in connection with the shifting of the idler 15 but in the opposite direction. When the car is again to be brought to a stop, the operator pushes the "stop" switch 30, which, through its connection with the "down" switch 29, opens the circuit to the magnet 19 resulting in a retraction of the idler 16. At the same time the circuit is closed to the solenoid 18 which acts in conjunction with the idler 15 as the solenoid 20 does in connection with the idler 16 and with like results.

Although but one specified embodiment of this invention has been herein shown and described, it will be understood that numerous details of the construction shown may be altered or omitted without departing from the spirit of this invention as defined by the following claims.

I claim:

1. A power transmission apparatus comprising a pair of power-producing members adapted to be continuously rotated in opposite directions, a driving member, a pair of power-transmitting friction members adapted to connect said power-producing members with said driving member, said friction members being normally inactive to transmit power, and mechanism actuatable to connect one or the other of said friction members in driving relation with its respective power producing member and said driving member.

2. A power transmission apparatus comprising a pair of power-producing pulleys adapted to be continuously rotated in opposite directions, a driving pulley, belts connecting said power-producing pulleys with said driving pulley, said belts being normally inactive to transmit power, and mechanism actuatable to tension one or the other of said belts so as to operatively connect such belt with its respective power-producing pulley and said driving pulley.

3. A power transmission apparatus comprising a pair of power-producing pulleys adapted to be continuously rotated in opposite directions, a driving pulley, belts connecting said power-producing pulleys with said driving pulley, said belts being normally inactive to transmit power, mechanism actuatable to tension one or the other of said belts so as to operatively connect such belt with its respective power-producing pulley and said driving pulley, and electrical means for controlling the actuation of said mechanism.

4. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, and means for shifting one or the other of said idlers to tension the corresponding belt so as to operatively connect such belt with its respective power-producing pulley and said driving pulley.

5. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, means for shifting one or the other of said idlers to tension the corresponding belt so as to operatively connect such belt with its respective power-producing pulley and said driving pulley, solenoids connected to shift said idlers, and electrical means for causing the energization of one or the other of said solenoids so as to shift the connected idler to tension the corresponding belt and operatively connect such belt with its respective power-producing pulley and said driving pulley.

6. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, means for shifting one or the other of said idlers to tension the corresponding belt so as to operatively connect such belt with its respective power-producing pulley and said driving pulley, solenoids connected to shift said idlers, switch mechanism and an electrical circuit connecting said solenoids with a source of electricity whereby said solenoids may be energized for shifting said idlers so that one or the other of said belts may be tensioned for causing the rotation of said driven member in one direction or the other, and means included in said electrical circuit for temporarily maintaining the circuit closed to one of said solenoids after said switching mechanism has been shifted to open the circuit to the other of said solenoids.

7. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, a pair of solenoids connected to each of said idlers whereby either of the solenoids of each pair may be energized to shift the respective idler for tensioning the corresponding belt so as to provide a driving connection between the respective power-producing pulley and the driving pulley, the solenoids of each pair being differently wound so as to be capable of producing different pressures of said idler against the same belt, and switch mechanism and an electrical circuit connecting said solenoids with a source of electricity, said switch mechanism and circuit being arranged so that one solenoid of one pair may be energized to shift the respective idler for the purpose of causing the rotation of said driving member in one direction or so that the corresponding solenoid of the other pair may be energized for shifting the respective idler to cause said driving member to be operated in the opposite direction, said switch mechanism and circuit also being arranged to cause the energization of the other solenoid of said other pair when the current is cut off from the said one solenoid to said one pair and vice versa, for the purpose of providing a driving force counteracting the momentum of the driving member.

8. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, a pair of solenoids connected to each of said idlers whereby either of the solenoids of each pair may be energized to shift the respective idler for tensioning the corresponding belt so as to provide a driving connection between the respective power-producing pulley and the driving pulley, the solenoids of each pair being differently wound so as to be capable of producing different pressures of said idler against the same belt, switch mechanism and an electrical circuit connecting said solenoids with a source of electricity, said switch mechanism and circuit being arranged so that one solenoid of one pair may be energized to shift the respective idler for the purpose of causing the rotation of said driving member in one direction or so that the corresponding solenoid of the other pair may be energized for shifting the respective idler to cause said driving member to be operated in the opposite direction, said switch mechanism and circuit also being arranged to cause the energization of the other solenoid of said other pair when the current is cut off from the said one solenoid of said one pair and vice versa, for the purpose of providing a driving force counter-acting the momentum of the driving member, and means included in said circuit, for maintaining the circuit closed to one or the other of said other solenoids until said driving member has come substantially to a stop.

9. A power transmission apparatus comprising a pair of electric motors arranged for continuous rotation in opposite directions, a pulley on each of said motors, a driving member, belts connecting said driving member with each of said motor pulleys, said belts being normally inactive to transmit power, and mechanism adapted to tension one or the other of said belts so as to operatively connect such belt with its respective pulley and said driving member.

10. A power transmission apparatus comprising a pair of power-producing pulleys adapted to be continuously rotated in opposite directions, a driving pulley, belts connecting said power-producing pulleys with said driving pulley, said belts being normally inactive to transmit power, mechanism actuatable to tension one or the other of said belts so as to operatively connect such belt with its respective power-producing pulley and said driving pulley, and means for dissipating the heat created by the relative slippage of said belts and pulleys.

11. A power transmission apparatus comprising a pair of power-producing pulleys adapted to be continuously rotated in opposite directions, a driving pulley, belts connecting said power-producing pulleys with said driving pulley, said belts being normally inactive to transmit power, mechanism actuatable to tension one or the other of said belts so as to operatively connect such belt with its respective power-producing pulley and said driving pulley, and means for cooling said pulleys so as to dissipate the heat created by relative slippage of the belt thereon.

12. A power transmission apparatus comprising a pair of power-producing members adapted to be continuously rotated in opposite directions, a driving member, a pair of power-transmitting friction members adapted to connect said power-producing members with said driving member, said friction members being normally inactive to transmit power, brake mechanism normally urged into position to hold said driving member stationary, and mechanism actuatable for simultaneously retracting said brake mechanism and for connecting one or the other of said friction members in driving relation with its respective power-producing member, and said driving member.

13. A power transmission apparatus comprising a pair of power-producing pulleys adapted to be continuously rotated in opposite directions, a driving pulley, belts connecting said power-producing pulleys with said driving pulley, said belts being normally inactive to transmit power, brake mechanism normally urged into position to hold said driving member stationary, and mechanism actuatable for simultaneously retracting said brake mechanism and for tensioning one or the other of said belts so as to operatively connect such belt with its respective power-producing pulley and said driving pulley.

14. A power transmission apparatus comprising a pair of power-producing pulleys adapted to be continuously rotated in opposite directions, a driving pulley, belts connecting said power-producing pulleys with said driving pulley, said belts being normally inactive to transmit power, brake mechanism normally urged into position to hold said driving member stationary, mechanism actuatable for simultaneously retracting said brake mechanism and for tensioning one or the other of said belts so as to operatively connect such belt with its respective power-producing pulley and said driving pulley, and electrical means for controlling the actuation of said mechanism.

15. A power transmission apparatus comprising a pair of power-producing pulleys adapted to be continuously rotated in opposite directions, a driving pulley, belts connecting said power-producing pulleys with said driving pulley, said belts being normally inactive to transmit power, idlers arranged to bear upon said belts and normally urged into retracted positions, means for shifting one or the other of said idlers to tension the corresponding belt so as to operatively connect such belt with its respective power-producing pulley and said driving pulley, solenoids connected to shift said idlers, a brake member movable into and out of position to check the movement of said driving member and hold it in its stationary position, a driven member connected to actuate said brake member, an electric motor belt-connected to said driven member, tensioning means for maintaining a constant torque on said driven member sufficient to retract and hold retracted said brake member so long as said motor operates, and electrical means for simultaneously connecting said motor and one or the other of said solenoids with a source of electricity so as to start said motor and cause the shifting of an idler and tension the corresponding belt so as to operatively connect such belt with its respective power-producing pulley and said driving pulley.

Signed at Chicago this 12th day of September 1921.

AUSTIN KIMBLE.